March 24, 1936.   C. LITTLEFIELD   2,034,949
ARTICLE HANDLING DEVICE
Original Filed March 2, 1934   5 Sheets-Sheet 1

INVENTOR.
Carl Littlefield
BY Chappell Earl
ATTORNEYS

March 24, 1936.  C. LITTLEFIELD  2,034,949
ARTICLE HANDLING DEVICE
Original Filed March 2, 1934   5 Sheets-Sheet 2

INVENTOR.
Carl Littlefield
BY Chappell & Earl
ATTORNEYS

March 24, 1936.                  C. LITTLEFIELD                  2,034,949
                              ARTICLE HANDLING DEVICE
                    Original Filed March 2, 1934    5 Sheets-Sheet 4

INVENTOR.
Carl Littlefield
BY Chappell & Earl
ATTORNEYS

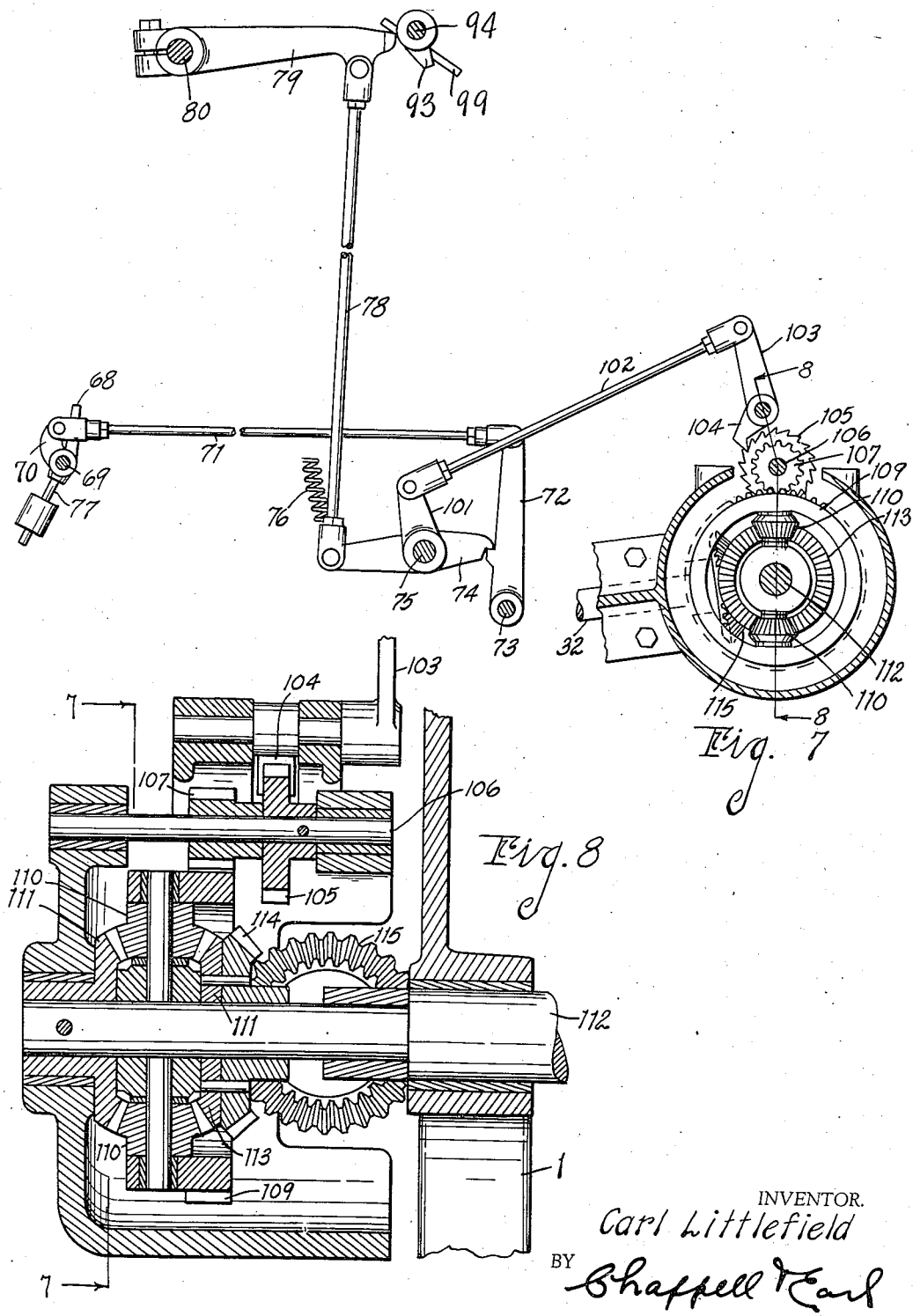

Patented Mar. 24, 1936

2,034,949

UNITED STATES PATENT OFFICE 2,034,949

ARTICLE HANDLING DEVICE

Carl Littlefield, Battle Creek, Mich., assignor to Battle Creek Bread Wrapping Machine Company, Battle Creek, Mich.

Original application March 2, 1934, Serial No. 713,677. Divided and this application September 4, 1934, Serial No. 742,531

8 Claims. (Cl. 198—21)

This is a division of my application for patent Serial No. 713,677, filed March 2, 1934, for Combined wrapping and slicing machine.

The main objects of this invention are:

First, to provide an improved article handling device which is especially well adapted for transferring sliced loaves of bread from one conveyor to another in a machine for slicing and wrapping sliced loaves of bread or for wrapping unsliced articles.

Second, to provide an improved transfer conveyor mechanism for the handling of sliced articles such as loaves of bread and the like.

Third, to provide improved means for transferring sliced loaves and controlling the feeding thereof to the slicing mechanism.

Objects relating to details and economies of my invention will appear from the description to follow. The invention is defined and pointed out in the claims. A structure which is a preferred embodiment of my invention is illustrated in the accompanying drawings, in which:

Fig. 7 is a fragmentary view partially in section on line corresponding to line 7—7 of Fig. 8 and showing details of the driving and timing means.

Fig. 8 is an enlarged fragmentary view mainly in section on line corresponding to line 8—8 of Fig. 7, showing details of the gearing.

Figure 1:
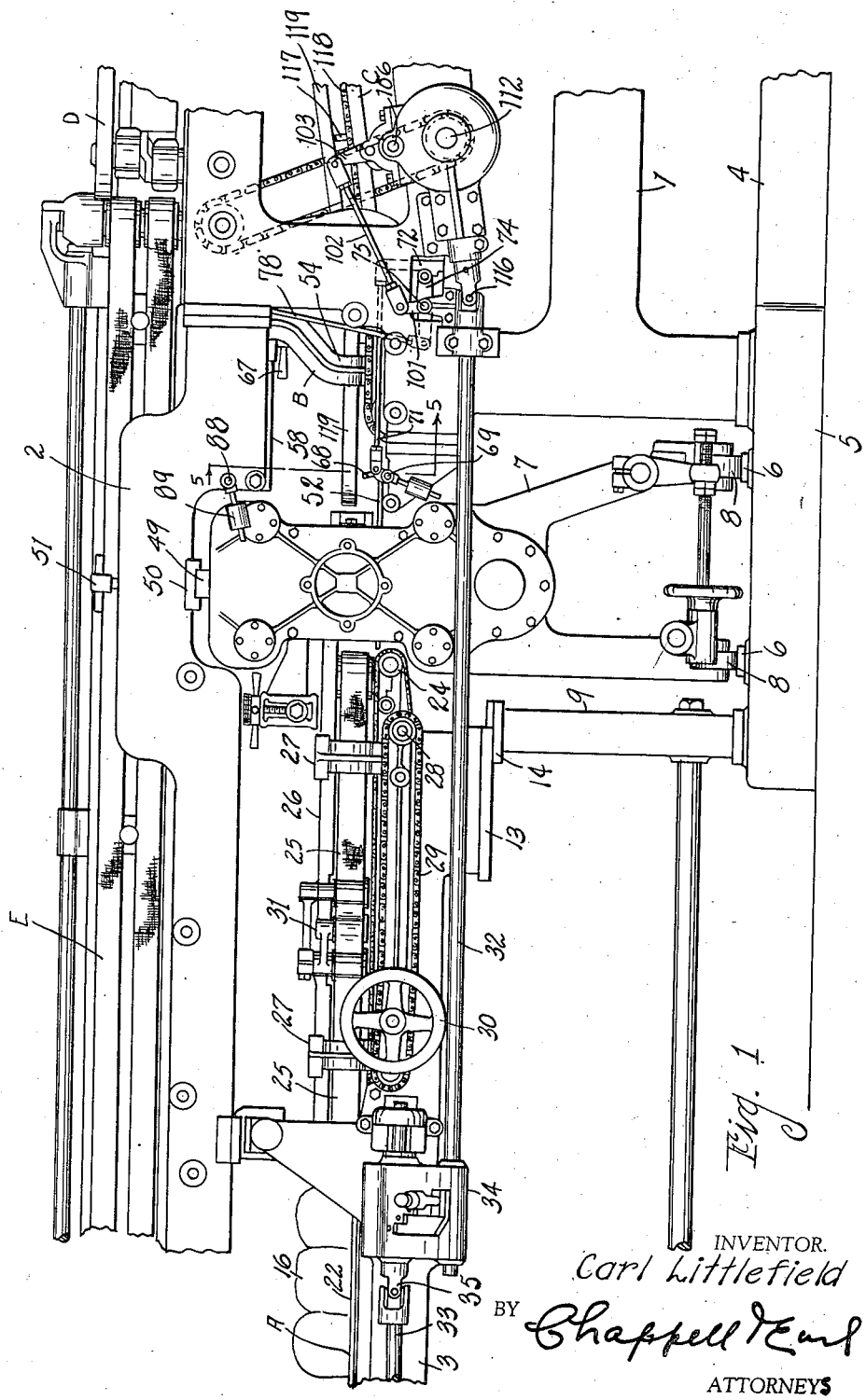
Fig. 1 is a fragmentary view in side elevation of a machine embodying the features of my invention.

Referring to the drawings, the main frame 1 of the machine is of suitable form and dimensions to support various operating parts and is provided with a forwardly projecting top portion 2 which overhangs a part of the adjustable frame 3. The base 4 for the main frame 1 is provided with a lateral extension 5, this lateral extension and the main frame having tracks or ways 6 thereon disposed transversely of the machine and on which the slicing machine designated generally by the numeral 7 is mounted.

The slicing machine is provided with rollers or carrying wheels 8 traveling on the tracks or ways 6 so that the slicing machine may be moved into operative position and the bread passing into the machine is delivered thereto. The slicing machine is shown in operative position in Fig. 1. The frame has slides 13 coacting with the slide bearings 14 on the pedestals 9. The adjustable frame is mounted for adjustment so that when in one position the slicing machine unit may be adjusted to operative position, and when the slicing machine unit is withdrawn or in inoperative position this frame may be adjusted to its inner position into cooperation with other parts of the feeding mechanism.

In this description I have treated the left hand portion of the machine, shown in Fig. 1, as the front end of the machine, inasmuch as the loaves or articles to be wrapped are fed into the machine from that end. It will be understood, however, that the articles are also discharged in wrapped condition from the same end of the machine. The unwrapped articles are designated by the numeral 16 while the wrapped articles are not shown.

I will first describe the path of the articles through the machine and then describe the several mechanisms in detail. The loaves of bread or other articles to be wrapped or operated upon are placed by hand or delivered automatically upon a feed conveyor mechanism designated generally by the letter A. This feed conveyor A delivers to the slicer 7 when the slicer is in operative position, or to my reciprocating transfer conveyor mechanism designated generally by the letter B. This transfer conveyor mechanism B delivers the loaves or articles to be wrapped to a conveyor designated by the letter C, by which conveyor the loaves are delivered to an elevator (not shown). This mechanism delivers the loaves to the wrapping mechanism (not shown), from which they are delivered to the sealing mechanism, designated generally by the letter D. The sealing mechanism delivers the articles to the delivery conveyor designated generally by the letter E.

The feed conveyor mechanism of this application comprises a bottom conveyor belt 22 supported at its inner end by the pulley 24. This bottom conveyor belt 22 transfers the loaves to a position between the side conveyor belts 25 which engage the end of the loaf, the latter being carried forward quite positively by these belts. When the slicing machine unit is in operative position, the loaves are fed into the knives of the sliding machine unit by the pressure of succeeding loaves. This slicing machine unit is not described and illustrated in detail but may be that of my Patent No. 1,938,844, dated December 12, 1933.

The belts 25 are provided with suitable pulleys at their ends, the belts and their pulleys and the carrying frames therefor comprising side bars 26 and brackets 27 mounted on reversely threaded screws 28 connected by suitable sprockets and coacting sprocket chains 29. The sprocket chains are driven from a hand wheel 30 so that the side belts are simultaneously adjusted to and from each other to accommodate loaves of varying lengths. A belt tightener unit, designated generally by the numeral 31, is provided for each feed conveyor side belt. The belt 22 is driven by a shaft 33 connected to a variable speed transmission gearing through universal joints 35. The shaft 33 is connected to the belt through a suitable gearing and pulley (not shown). This feed mechanism, when operatively associated with the slicing machine, is substantially like that of my Patent No. 1,965,659, dated July 10, 1934. As stated, the feed conveyor may be adjusted to cooperate with the slicing machine or with certain of the conveyor features when the slicing mechanism is in inoperative position.

Figure 4:
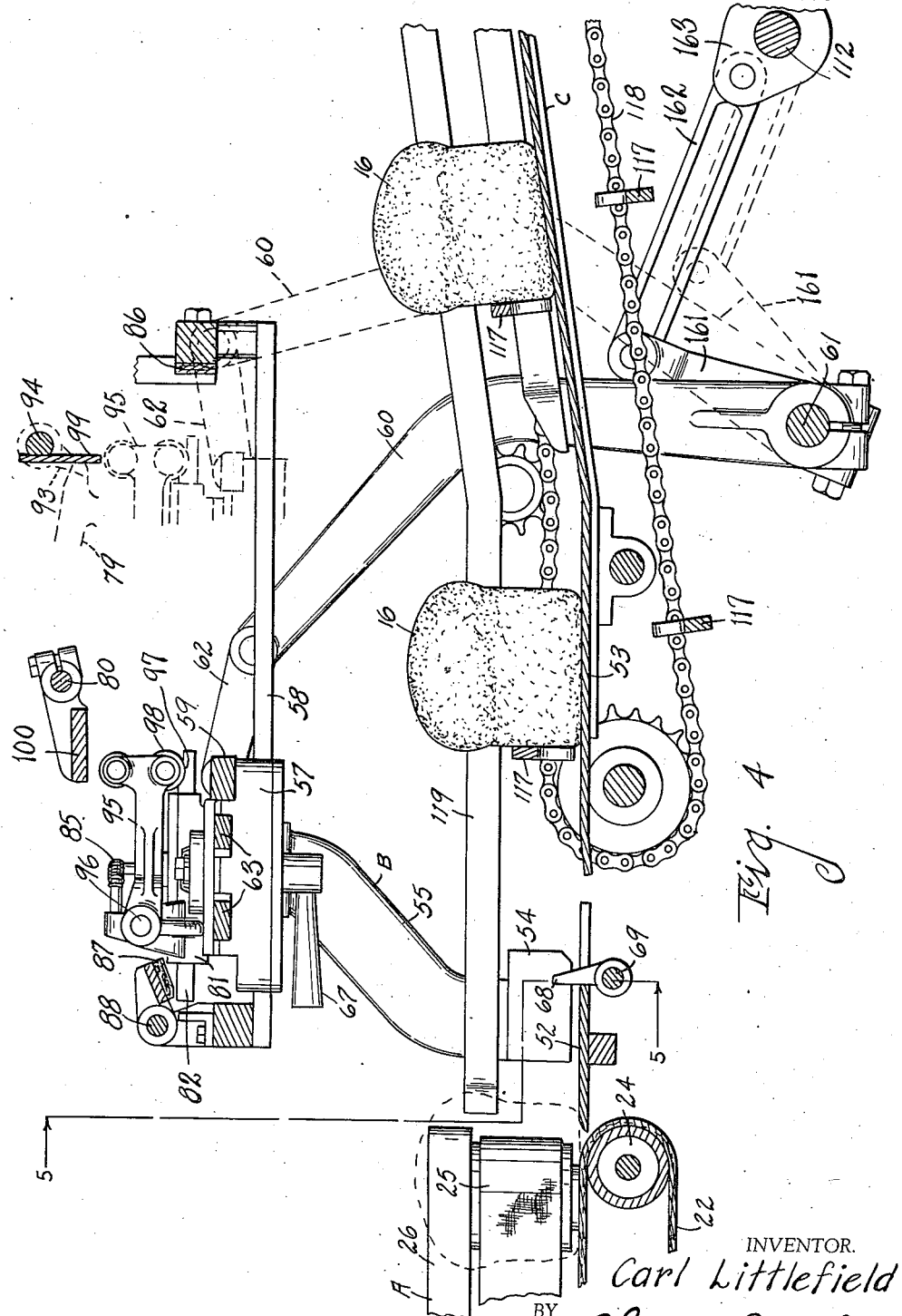
Fig. 4 is an enlarged fragmentary view partially in section on a line corresponding to line 4—4 of Figs. 3, 5, and 6.

The slicing machine has a guide bar 49 on the top thereof coacting with a guide bar 50 on the frame 1. When the frame 3 is retracted, the slicing machine may be pushed into operative position and locked in that position by means of screws 51 which engage the guide bar 49. With the slicing machine in operative position, the loaves are delivered from the slicing machine onto the delivery table 52 (Fig. 4). When the slicer is in inoperative position, the loaves are delivered directly by the feed conveyor to this delivery table 52.

Figures 2, 3:
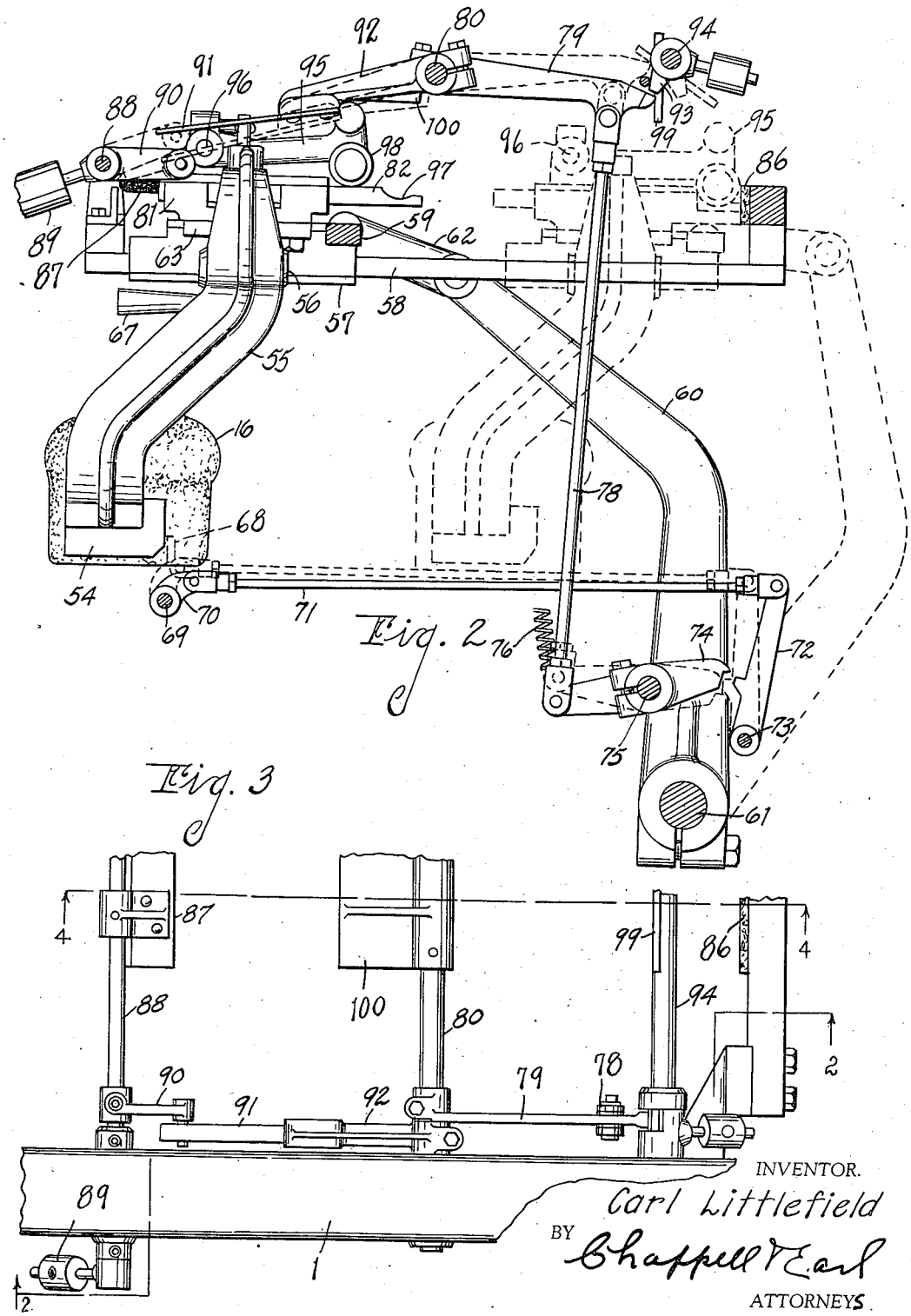
Fig. 2 is a fragmentary view partially in section on line 2—2 of Fig. 3, showing details of the loaf feed and feed controlling mechanism.
Fig. 3 is a fragmentary plan view of certain of the parts shown in Fig. 2
Figure 6:
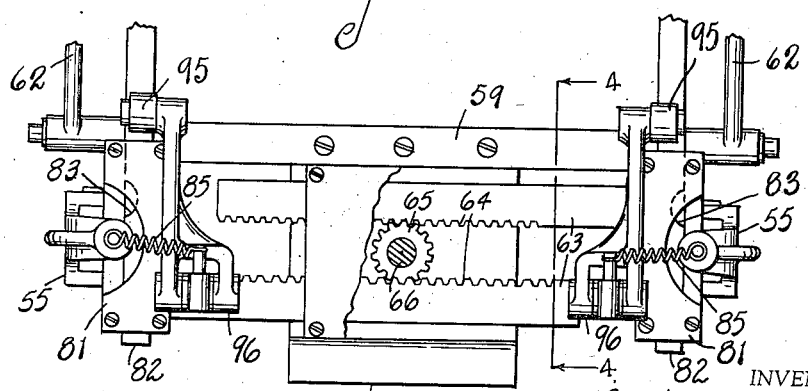
Fig. 6 is a fragmentary view partially in section on line corresponding to line 6—6 of Fig. 5.

The loaves, either sliced or whole as the case may be, are discharged from this table 52 and delivered to the conveyor slideway 53 of the conveyor C by means of transfer jaws 54 engaging the ends of the loaf at the position shown by full lines in Figs. 2 and 4, carrying the loaf forwardly onto the conveyor slideway 53. These jaws 54 are carried by arms 55 pivoted at 56 on the reciprocating carriage 57 (Fig. 2), which is mounted on the slideway 58 disposed centrally above the path of the loaves. This carriage includes a cross piece 59. The carriage is reciprocated by means of the arms 60 on the rockshaft 61, the arms being connected to the cross piece 59 on the carriage by means of the links 62. The jaw arms are pivotally mounted on the outer ends of the jaw supporting bars 63 which are slidably mounted on the carriage for longitudinal adjustment. These bars are provided with racks 64 (Fig. 6) coacting with a pinion 65 having a shaft 66 provided with a handpiece 67 (Figs. 2 and 4) by means of which the jaw supporting bars may be adjusted to adjust the jaws of the length of the particular article to be wrapped. The opening and closing of the jaws is controlled by the reciprocation of the carriage 57. The closing of the jaws is timed by the article that is advanced either from the feed conveyor or through the slicer to position to be engaged by the jaws, a loaf of bread being indicated at 16 in Fig. 2.

Figure 5:
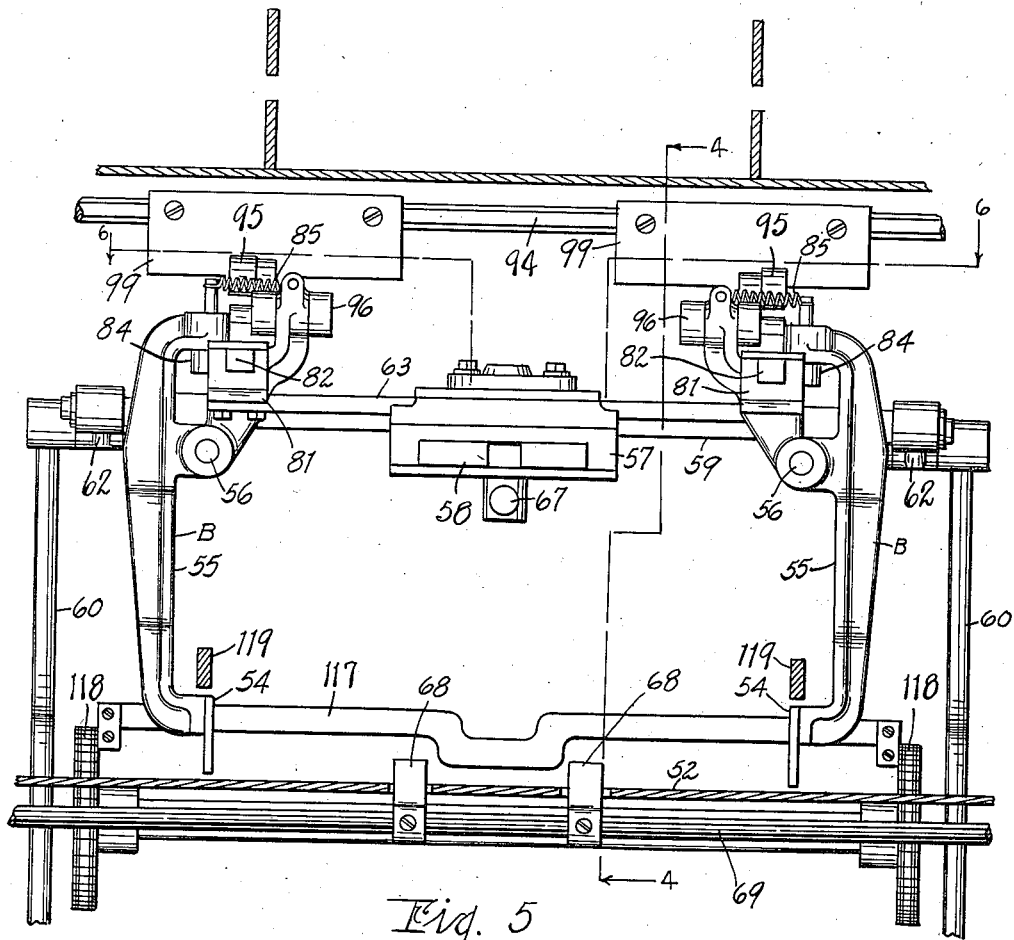
Fig. 5 is a fragmentary view partially in transverse section taken on line 5—5 of Figs. 1 and 4, the view being taken with the feed members in advanced position as shown by dotted lines in Fig. 2.

A trip 68 projects through a slot in the table 52. This trip is mounted on a rockshaft 69 having an arm 70 (Figs. 2 and 7) thereon connected by the link 71 to a latch lever 72 pivoted at 73. This latch lever coacts with the trip lever 74 pivoted at 75 and actuated by means of the spring 76. The latch lever and the trip lever have coacting engaging parts, as shown in Figs. 2 and 7, the parts being shown in engagement in Fig. 7 and in disengaged position in Fig. 2. A weighted arm 77 on the rockshaft 69 (Fig. 7) returns the trip and connected parts to initial position. The trip lever 74 is connected by a link 78 to an arm 79 on the rockshaft 80. Each jaw supporting bar 63 is provided with a head or bracket 81 at its outer end and carrying the pivot 56 for the jaw arm and also slidably supporting a jaw controlling cam member 82 having a cam recess 83 (Fig. 6) therein into which the roller 84 (Fig. 5) on the arm drops under the action of the spring 85, thereby opening the jaws. The flat side of the cam member coacts with the roller to close the jaws. At the end of each forward stroke of the carriage, the cam member engages the bumper 86 (Fig. 2) and on the return stroke of the carriage engages with the actuating tappet 87, provided the tappet is in its actuated position. The tappets 87 are mounted on a rockshaft 88 provided with a weighted arm 89 (Fig. 2) acting to swing the tappets to inoperative position. The tappet is shown in operative position in Fig. 2 and in inoperative position in Fig. 4. The tappet is controlled through the trip lever mechanism described, the rockshaft having arms 90 projecting forwardly therefrom to be engaged by the spring extensions 91 on the arms 92 carried by the rockshaft 80.

Referring to Fig. 2, it should be pointed out that the tappet is shown in actuated position by full lines and in normal or initial position by dotted lines, while the lever 92 is shown in its unactuated position, being held in this position by the detent 93 on the rockshaft 94. The detent 93 is tripped by the resetting dog 95 which is pivoted at 96 on the head 81. This resetting dog is controlled by cam member 82 which has a recess 97 into which the roller 98 on the resetting dog drops when the cam member is actuated by coming into contact with the abutment 86 (see dotted position at right of Fig. 2).

The resetting dog 95 on the forward stroke of the carriage comes into contact with the trip arm 99 on the rockshaft 94, swinging the detent 93 out of engagement or into coacting relation with the lever 79, allowing the lever to move upwardly to the dotted position under the action of the spring 76 and swinging the arm 92 downwardly to actuate the tappet to cam actuating position. The actuation of the cam member 82 by the tappet to close the jaws also lifts the resetting dog 95, which is designed to engage an arm 100 on the rockshaft 80, resetting or forcing the arm 79 downwardly to be re-engaged by the detent 93.

The driving shaft 32 for the feed conveyor is also controlled through this article controlled grip mechanism. The rockshaft 75 has an arm 101 (Fig. 7) connected by the link 102 to the arm 103 controlling the pawl 104. This pawl coacts with the ratchet wheel 105 on the shaft 106 to control the rotation of the shaft; that is, when the pawl is in engagement the shaft is held against rotation, thereby holding the planetary control pinion 107 against rotation. This planetary control pinion engages a peripheral gear on the planetary drum 109 (Fig. 8) carrying the planetary gears 110. These planetary gears coact with a gear 111 keyed to the shaft 112 and with the gear 113 rotatable on the shaft but pinned to the driven gear 114 meshing with the gear 115 on the shaft 32. It will be noted that this shaft is provided with a universal joint 116 (Fig. 1).

With this arrangement of the parts, the feed conveyor is driven continuously through the mechanism described, so long as the pawl 104 remains in engagement through the connections described, preventing the rotation of the planetary drum. However, when the pawl is disengaged, the planetary drum is free to rotate and this results in the stopping of the gear 113 of the planetary gearing and consequently the feed conveyor. This control, as has been pointed out, is from the trip 68 so that the feed conveyor is synchronized, either to feed the loaves to the slicing unit or directly to the table 52 in proper timed relation to be engaged by the jaws 54.

The rockshaft 61 is provided with an arm 161 connected by the link 162 to a crank 163 on the shaft 112.

These feed or transfer jaws 54 deliver to the conveyor way 53 of the conveyor C in timed relation so that the articles are picked up by the flights 117 on the conveyor chain 118. The transfer jaws gripping the ends of the loaf deliver it between the side bars 119 of the conveyor C, between which it is carried along by the flights and delivered on to the feed plunger or elevator (not shown) by which the loaves are delivered to the wrapping mechanism.

From the above description of my invention, it will be appreciated by those skilled in the art that my article handling device is simple and economical in its parts and very efficient and effective for the purpose intended. While I have described the invention in connection with the handling of sliced loaves of bread, it is to be understood that my device is capable of handling sliced as well as unsliced articles and is not limited to bread.

I have illustrated and described my improvements in an embodiment which I have found very practical. I have not attempted to illustrate or describe other embodiments or adaptations, as it is believed this disclosure will enable those skilled in the art to embody or adapt my improvements as may be desired. Although I have shown and described a certain specific embodiment of my invention, I am fully aware that many modifications thereof are possible. My invention is not to be restricted except insofar as is necessitated by the prior art and by the spirit of the appended claims.

Having thus described my invention what I claim as new and desire to secure by Letters Patent is:

1. In a machine of the class described, the combination of a table, a conveyor comprising a way, a transfer conveyor comprising a slide bar disposed longitudinally above said table and conveyor way, a carriage reciprocatingly mounted on said slide bar, jaw supporting bars slidably mounted on said carriage for adjustment transversely of said slide bar and provided with heads at their outer ends, jaws provided with arms pivotally mounted on said heads, springs acting to urge said jaws to open position, cam members slidably mounted on said heads and when in one position acting to close said jaws against the tension of said springs and in another position to permit the springs to open the jaws, tappets movably mounted on a stationary part of the machine and acting when in actuated position to be contacted by said cam members by virtue of the movement of the carriage to actuate said cam members to jaw closing position at the end of the work receiving stroke of the carriage, stops for actuating said cam members to jaw opening position at the end of the work delivery stroke of the carriage, means for feeding articles to said table, an article actuated trip member operatively associated with said table to be actuated by the articles delivered thereto, a tappet actuating lever, a detent for holding said tappet actuating lever in inoperative position, a trip lever controlled by said article actuated trip member and operatively connected to said tappet actuating lever, resetting members pivotally mounted on said jaw carrying heads and operatively associated with said cam members to be actuated and supported in actuated position thereby when the cam members are actuated to jaw closing position to reset the tappet actuating lever on the work receiving stroke of the carriage and to trip said detent on the work delivery stroke of the carriage, said cam members permitting the return of said resetting members to inoperative position when the cam members are actuated to permit the opening of the jaws, driving means for said feed means, and control means therefor operatively associated with said article actuated trip.

2. In a machine of the class described, the combination of a table, a conveyor comprising a way, a transfer conveyor comprising a slide bar disposed longitudinally above said table and conveyor way, a carriage reciprocatingly mounted on said slide bar, jaw supporting bars slidably mounted on said carriage for adjustment transversely of said slide bar and provided with heads at their outer ends, jaws provided with arms pivotally mounted on said heads, springs acting to urge said jaws to open position, cam members slidably mounted on said heads and when in one position acting to close said jaws against the tension of said springs and in another position to permit the springs to open the jaws, tappets movably mounted on a stationary part of the machine and acting when in actuated position to be contacted by said cam member by virtue of the movement of the carriage to actuate said cam members to jaw closing position at the end of the work receiving stroke of the carriage, stops for actuating said cam members to jaw opening position at the end of the work delivery stroke of the carriage, means for feeding articles to said table, an article actuated trip member operatively associated with said table to be actuated by the articles delivered thereto, a tappet actuating lever, a detent for holding said tappet actuating lever in inoperative position, a trip lever controlled by said article actuated trip member and operatively connected to said tappet actuating lever, and resetting members pivotally mounted on said jaw carrying heads and operatively associated with said cam members to be actuated and supported in actuated position thereby when the cam members are actuated to jaw closing position to reset the tappet actuating lever on the work receiving stroke of the carriage and to trip said detent on the work delivery stroke of the carriage, said cam members permitting the return of said resetting members to inoperative position when the cam members are actuated to permit the opening of the jaws.

3. In a machine of the class described, the combination of a table, a conveyor comprising a way, a transfer conveyor comprising a slide bar disposed above said table and conveyor way, a carriage reciprocatingly mounted on said slide bar, jaws pivotally mounted on said carriage, springs acting to urge said jaws to open position, cam members slidably mounted on said carriage and when in one position acting to close said jaw against the tension of said springs and in another position to permit the springs to open the jaws, tappets movably mounted on a stationary part of the machine and acting when in actuated position to be contacted by said cam members by virtue of the movement of the carriage to actuate said cam members to jaw closing position at the end of the work receiving stroke of the carriage, stops for actuating said cam members to jaw opening position at the end of the work delivery stroke of the carriage, means for feeding articles to said table, an article actuated trip member operatively associated with said table to be actuated by the articles delivered thereto, a tappet actuating lever, a detent for holding said tappet actuating lever in inoperative position, a trip lever controlled by said article actuated trip and operatively connected to said tappet actuating lever, resetting members on said carriage operatively associated with said cam members to be actuated thereby when the cam members are actuated to jaw closing position and acting to reset the tappet actuating lever on the work receiving stroke of the carriage and to trip said detent on the work delivery stroke of the carriage, said cam members permitting the return of said resetting members to inoperative position when the cam members are actuated to permit the opening of the jaws, driving means for said feed means, and control means therefor operatively associated with said article actuated trip.

4. In a machine of the class described, the combination of a table, a conveyor comprising a way, a transfer conveyor comprising a slide bar disposed above said table and conveyor way, a carriage reciprocatingly mounted on said slide bar, jaws pivotally mounted on said carriage, springs acting to urge said jaws to open position, cam members slidably mounted on said carriage and when in one position acting to close said jaws against the tension of said springs and in another position to permit the springs to open the jaws, tappets movably mounted on a stationary part of the machine and acting when in actuated position to be contacted by said cam members by virtue of the movement of the carriage to actuate said cam members to jaw closing position at the end of the work receiving stroke of the carriage, stops for actuating said cam members to jaw opening position at the end of the work delivery stroke of the carriage, means for feeding articles to said table, an article actuated trip member operatively associated with said table to be actuated by the articles delivered thereto, a tappet actuating lever, a detent for holding said tappet actuating lever in inoperative position, a trip lever controlled by said article actuated trip and operatively connected to said tappet actuating lever, and resetting members on said carriage operatively associated with said cam members to be actuated thereby when the cam members are actuated to jaw closing position and acting to reset the tappet actuating lever on the work receiving stroke of the carriage and to trip said detent on the work delivery stroke of the carriage, said cam members permitting the return of said resetting members to inoperative position when the cam members are actuated to permit the opening of the jaws.

5. In a machine of the class described, the combination of a table, a reciprocating carriage, jaw supporting bars slidably mounted on said carriage for adjustment transversely of the path of the carriage and provided with opposed racks and with heads at their outer ends, an adjusting pinion coacting with said racks, jaws provided with arms pivotally mounted on said heads, springs acting to urge said jaws to open position, cam members slidably mounted on said heads and when in one position acting to close said jaws against the tension of said springs and in another position to permit the springs to open the jaws, pivotally mounted tappets on a stationary part of the machine acting when in actuated position to be contacted by said cam members by virtue of the movement of the carriage to actuate said cam members to jaw closing position at the end of the work receiving stroke of the carriage, stops for actuating said cam members to jaw opening position at the end of the work delivery stroke of the carriage, means for feeding articles to said table, an article actuated trip member operatively associated with said table to be actuated by the articles delivered thereto, a tappet actuating lever, a detent for holding said tappet actuating lever in inoperative position, a trip lever controlled by said article actuated trip and operatively connected to said tappet actuating lever, and resetting members pivotally mounted on said jaw carrying heads and operatively associated with said cam members to be actuated and supported in actuated position thereby when the cam members are actuated to jaw closing position to reset the tappet actuating lever on the work receiving stroke of the carriage and to trip said detent on the work delivery stroke of the carriage, said cam members permitting the return of said resetting members to inoperative position when the cam members are actuated to permit the opening of the jaws.

6. In a machine of the class described, the combination of a reciprocating carriage, jaw supporting bars slidably mounted on said carriage for adjustment transversely of the path of the carriage, means for simultaneously adjusting said bars, jaws pivotally mounted on said carriage, cam members for actuating said jaws movably mounted on said carriage, tappets movably mounted on a stationary part of the machine acting when in actuated position to be contacted by said cam members by virtue of the movement of the carriage to actuate said cam members to jaw closing position at the end of the work receiving stroke of the carriage, means for actuating said cam members to jaw opening position at the end of the delivery stroke of the carriage, and means for actuating said tappets controlled by the articles translated.

7. In a machine of the class described, the combination of a reciprocating carriage, jaws mounted on said carriage, cam members for actuating said jaws movably mounted on said carriage, tappets movably mounted on a stationary part of the machine acting when in actuated position to be contacted by said cam members by virtue of the movement of the carriage to actuate said cam members to jaw closing position at the end of the work receiving stroke of the carriage, means for actuating said cam members to jaw opening position at the end of the delivery stroke of the carriage, and means for actuating said tappets controlled by the articles translated.

8. In a machine of the class described, the combination with a table, a conveyor way having side bars extending over said table, a conveyor comprising conveyor chains operatively associated with said conveyor way and extending forwardly into operative relation to said table, and means for transferring articles in the form of sliced loaves from said table to said conveyor comprising a reciprocatingly mounted carriage movable between said table and said conveyor and having article gripping jaws engaging the articles beneath said side bars in transferring them from the table to the conveyor.

CARL LITTLEFIELD.